United States Patent [19]
Li et al.

[11] Patent Number: 5,965,628
[45] Date of Patent: Oct. 12, 1999

[54] LOW DENSITY HYDROCARBON POLYMER FOAM

[75] Inventors: Irene Qian Li; Toshio Suzuki, both of Midland, Mich.

[73] Assignee: Dow Corning Corporation, Midland, Mich.

[21] Appl. No.: 09/220,026

[22] Filed: Dec. 23, 1998

[51] Int. Cl.$^6$ .......................................................... C08J 9/02
[52] U.S. Cl. ............................ 521/142; 521/143; 521/149; 521/154; 528/15
[58] Field of Search ..................................... 521/142, 143, 521/149, 154; 528/15

[56] References Cited

U.S. PATENT DOCUMENTS

| | | | |
|---|---|---|---|
| 3,070,555 | 12/1962 | Bruner | 260/2.5 |
| 3,338,847 | 8/1967 | Nitzsche | 260/2.5 |
| 3,429,838 | 2/1969 | Hersh | 260/2.5 |
| 3,923,705 | 12/1975 | Smith | 260/2.5 |
| 4,590,222 | 5/1986 | Bauman | 521/88 |
| 4,879,317 | 11/1989 | Smith | 521/82 |
| 5,652,276 | 7/1997 | Ando | 521/88 |

*Primary Examiner*—Morton Foelak
*Attorney, Agent, or Firm*—Alex Weitz

[57] ABSTRACT

There is disclosed a composition which, when cured, results in a foamed product having a low bulk density, said composition comprising:

(A) 100 parts by weight of a saturated hydrocarbon polymer containing at least 1.5 alkenyl groups per molecule;

(B) 5 to 20 parts by weight of a silicone crosslinker comprising an average of 7 to 50 organohydrogensiloxane units;

(C) 1 to 20 parts by weight of water;

(D) at least one component selected from the group consisting of
   (D') 0.1 to 20 parts by weight of an alcohol having 1 to 12 carbon atoms and
   (D") 5 to 30 parts by weight of a hydrocarbon liquid having a normal boiling point below 100° C.; and (E) a sufficient amount of a hydrosilation catalyst to promote crosslinking of said polymer by said crosslinker.

12 Claims, No Drawings

LOW DENSITY HYDROCARBON POLYMER FOAM

FIELD OF THE INVENTION

The present invention relates to hydrocarbon polymer foam having a low bulk density. More specifically, the invention relates to a foam which is prepared by curing an alkenyl-functional hydrocarbon polymer via a hydrosilation reaction while simultaneously expanding the curing polymer with hydrogen gas, the latter being primarily generated by the reaction of an organohydrogenpolysiloxane component with water.

BACKGROUND OF THE INVENTION

Silicone, polyurethane, and other polymeric foamed products are well known in the art. These expanded systems find application in such diverse areas as thermal insulation, vibration damping, noise control, furniture and automotive cushioning and construction, inter alia.

Ando et al., in U.S. Pat. No. 5,652,276, disclose a foaming composition comprising an organic polymer having a carbon-carbon double bond, an SiH-functional compound and an OH-functional compound. The polymer is preferably a polyether and the OH-functional compound can be water, an alcohol or a carboxylic acid. Ando et al. generally appreciate that the key to final foam character is a balance between the crosslinking and gassing reactions during foaming. However, there is no clear teaching as to how one of ordinary skill in the art should manipulate the various components to arrive at a desired expansion ratio or other physical property for any given polymer or class of polymers.

SUMMARY OF THE INVENTION

It has now been discovered that low density foams can be prepared from hydrocarbon polymers according to the general methods described by Ando et al., cited supra, wherein the SiH-functional component is limited to a specific polymeric size while the component responsible for expansion (i.e., gassing reaction) is a combination of water and either an alcohol or a low-boiling liquid. More particularly, the foams produced according to the present invention have a bulk density of no more than 12 lb/ft$^3$ (192 kg/m$^3$). Such expanded compositions are highly desirable from a cost perspective and they facilitate fabrication of low weight, energy-saving components for, e.g., motor vehicles.

The invention, therefore, relates to a foaming composition comprising:
(A) 100 parts by weight of a hydrocarbon polymer containing at least 1.5 alkenyl groups per molecule;
(B) 5 to 20 parts by weight of a silicone crosslinker comprising an average of 7 to 50 organohydrogensiloxane units;
(C) 1 to 20 parts by weight of water;
(D) at least one component selected from the group consisting of
  (D") 0.1 to 20 parts by weight of an alcohol having 1 to 12 carbon atoms and
  (DΔ) 5 to 30 parts by weight of a hydrocarbon liquid having a normal boiling point below 100° C.; and
(E) a sufficient amount of a hydrosilation catalyst to promote crosslinking of said polymer by said crosslinker.

The invention further relates to a low density foam produced from the above composition.

DETAILED DESCRIPTION OF THE INVENTION

Polymer (A) can be any hydrocarbon polymer having no unsaturated carbon-carbon bonds other than aromatic rings along its main chain (i.e., free of aliphatic unsaturation). This polymer contains an average of at least 1.5 alkenyl groups having 2 to 10 carbon atoms in its molecule. Preferably, the polymer contains an average of at least 2 such alkenyl groups, vinyl, allyl and hexenyl groups being highly preferred. As used herein, the term "polymer" is generic to homopolymers, oligomers, interpolymers and copolymers, all of which are within the scope of the instant invention. The alkenyl functionality may be located at the terminals of the polymer molecule or along its main chain, or both. Although the number average molecular weight of (A) can range from 500 to 100,000, it is preferably 2000 to 50,000, more preferably 3,000 to 30,000.

Non-limiting examples of component (A) include polymerized products or copolymerized products of monomers such as:
(i) dienes, such as butadiene, isoprene and cyclopentadiene, wherein the polymer is subsequently hydrogenated;
(ii) olefins having 2 to 6 carbon atoms, such as ethylene, propylene, isobutylene, 1-butene and hexene; and
(iii) styrenic monomers, such as styrene, α-methyl styrene and p-methylstyrene.

Preferably, the saturated hydrocarbon polymer (A) is a linear or branched polymer or interpolymer wherein at least 50 mole percent, preferably at least 80 mole percent, of the repeat units are isobutylene repeat units of the following structure

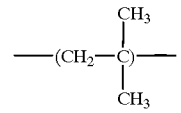

One or more hydrocarbon monomers, such as isomers of butylene, styrene, derivatives of styrene, isoprene and butadiene, may be copolymerized with the isobutylene, the preferred co-monomer being selected from 1-butene, α-methyl styrene, p-methylstyrene, isoprene, cyclopentadiene and butadiene. It is most preferred that the saturated hydrocarbon polymer is a polyisobutylene (PIB) homopolymer containing vinyl, allyl or hexenyl groups.

The above polymers are known in the art and various patent as well as technical publications describe the preparation of many representative examples thereof.

Silicone crosslinker (B) is an organohydrogenpolysiloxane having an average of 7 to 50 organohydrogensiloxane units of the formula

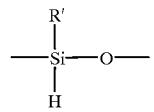

wherein R' is selected from the group consisting of alkyl radicals having 1 to 6 carbon atoms and aryl radicals having 6 to 14 carbon atoms. Unlike the general SiH-functional crosslinkers taught by Ando et al., cited supra, it has been found that use of crosslinkers having fewer than 7 or more than 50 such siloxane units results in products having foam densities outside the scope of the invention.

Preferably, (B) is a linear polysiloxane having the formula

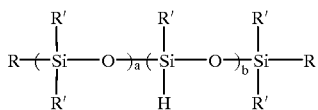

wherein R' is independently selected from the group consisting of alkyl radicals having 1 to 6 carbon atoms and aryl radicals having 6 to 14 carbon atoms, R is independently selected from the group consisting of hydrogen, alkyl radicals having 1 to 10 carbon atoms and aryl radicals having 6–14 carbon atoms, a has an average value of 0 to 10 and b has an average value of 7 to 50. It is particularly preferred that R and R' are each methyl, a is 0 to 5 and b is 10 to 30. Most preferably, the polysiloxane has the formula

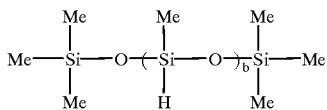

in which Me hereinafter denotes a methyl group and b has an average value of 10 to 20.

Component (C) is water and is the principal agent responsible for expansion of the foam due to the formation of hydrogen gas as it reacts with the SiH functionality of silicone crosslinker (B). Preferably, the water is deionized. Furthermore, the water can be incorporated into the composition as a hydrated salt or it can be absorbed water on solid particles (e.g., on a filler).

Component (D) is at least one compound selected from (D') an alcohol having 1 to 12 carbon atoms or (D") a hydrocarbon liquid having a normal boiling point below 100° C. Suitable alcohols may be illustrated by methanol, ethanol, isopropanol, n-propanol, n-butanol, n-pentyl alcohol, n-hexyl alcohol, isooctyl alcohol, decanol and dodecanol. It is preferred that the alcohol have 1 to 8 carbon atoms, most preferably 1 to 4 carbons. Hydrocarbon component (D") is a liquid at ordinary temperatures (i.e., 25° C.). It may be illustrated by compounds such as pentane, hexane, heptane and isooctane, isomers of pentane and hexane being preferred.

Catalyst (E) promotes crosslinking of polymer (A) by crosslinker (B) via a hydrosilation reaction and is a platinum group metal or compound thereof. The metal may be selected from platinum, palladium or rhodium, platinum compounds being preferred based on the high activity level of these catalysts in hydrosilation reactions. Examples include platinum catalysts such as platinum black, platinum supported on silica, platinum supported on carbon, chloroplatinic acid, alcohol solutions of chloroplatinic acid, platinum/olefin complexes, platinum/alkenylsiloxane complexes, platinum/beta-diketone complexes, platinum/phosphine complexes and the like; rhodium catalysts, such as rhodium chloride and rhodium chloride/di(n-butyl)sulfide complex and the like; and palladium catalysts, such as palladium on carbon, palladium chloride and the like. Component (E) is preferably selected from a platinum complex produced by reacting chloroplatinic acid and divinyltetramethyldisiloxane which is diluted with dimethylvinylsiloxy endblocked polydimethylsiloxane, prepared according to U.S. Pat. No. 3,419,593 to Willing or a neutralized complex of platinous chloride and divinyltetramethyldisiloxane, prepared according to U.S. Pat. No. 5,175,325 to Brown et al. , these patents being hereby incorporated by reference.

In addition to components (A) through (E), the composition of the present invention may contain minor amounts of various ingredients which do not interfere with the foaming characteristics such that the final foamed product has a density no greater than 192 kg/m$^3$. Typically, the total amount of such additional ingredients is no more than about 60% based on the total weight of the composition. Examples of suitable ingredients are plasticizers, such as hydrocarbon oils and fatty acid esters and polyesters having a viscosity below 10,000 mPa-s at 25° C.; catalysts which promote the hydrolysis of SiH groups to release hydrogen gas, such as tin carboxylate salts; fillers, such as silica, mica, clay, carbon black and calcium carbonate; stabilizers, such as titanium dioxide and hindered phenols; adhesion promoters, such as organofunctional alkoxysilanes; flame retardants; inhibitors; ultraviolet stabilizers; and the like.

It is preferred that the foaming composition includes at least one hydrosilation inhibitor in order to control the relative rates of the hydrosilation reaction and the hydrolysis reaction. These are illustrated by the acetylenic compounds disclosed in U.S. Pat. No. 3,445,420, alkenyl substituted siloxanes of the type described in U.S. Pat. No. 3,989,667 and methylvinylcyclopolysiloxanes, the latter cyclic compounds having 4 or 5 siloxane units being particularly preferred. Inhibitor concentrations of 1–100 mole of inhibitor per mole of platinum group metal are generally sufficient for the acetylenic compounds. Preferably, about 10 to 1,000 moles of inhibitor per mole of platinum group metal are used when the inhibitor is a methylvinylcyclopolysiloxane. The type and optimal concentration of inhibitor that will provide desired foam compositions can readily be determined by routine experimentation.

In order to prepare a foaming composition according to the present invention, it is preferred to first thoroughly blend 100 parts by weight of polymer (A) with 5 to 20 parts by weight of silicone crosslinker (B); 1 to 20 parts by weight of water (C); 0.1 to 20 parts by weight of an alcohol (D') and/or 5 to 30 parts by weight of hydrocarbon liquid (D"); and a sufficient amount of a hydrosilation catalyst (E) to promote crosslinking of said polymer by said crosslinker. Preferably, 10 to 20 parts by weight of (B), 5 to 10 parts by weight of (C), 0.5 to 10 parts by weight (D') and 10 to 20 parts by weight (D") are used for each 100 parts by weight of (A). If one or more of the optional ingredients is to be incorporated, it is preferably mixed with the polymer before addition of the remaining required components (i.e., to form a masterbatch with the polymer). To the above mixture, hydrosilation catalyst (E) is added at a level sufficient to cure the polymer via a hydrosilation reaction. Typically, the catalyst is added at an equivalent metal concentration of from 0.1 to 500 parts by weight, preferably from 1 to 50 parts by weight, per million parts (ppm) of the combined weight of (A) and (B). Alternatively, components (A), (D"), (E), inhibitor and/or other optional components are mixed and the water and (D') are added thereto. To this combination there is finally added component (B) to complete the foaming composition.

Any suitable method of mixing the components may be employed as long as a homogeneous dispersion of the components in polymer (A) is attained. Examples of mixing equipment which can be used for this purpose include hand mixers, static mixers, bowl mixers, planetary mixers, kneeders, centrifugal mixers, and the like.

The compositions of the present invention may be foamed according to conventional methods known in the art to form foamed stock having a desired cross-section. Alternatively, they may be foamed in place via a continuous foaming process, such as a foam slab fabrication process, or the like.

Preferably, the foaming process is carried out at room temperature (i.e., approximately 25° C.) but a temperature range of 20 to 70° C. will generally also yield the desired foamed product. When the compositions of the present invention are foamed, as described above, they result in foamed products having a bulk density of no greater than 12 lb/ft$^3$ (192 kg/m$^3$) as determined by American Society for Testing Materials (ASTM) method D 3574-95, test A.

The resulting foams find utility as acoustic insulation, thermal insulation, vibration damping material, furniture and automotive cushions, sealing material, shock absorbing material, packaging material, buoyant material and construction material, inter alia. Because the foams of the invention have such low densities, they are particularly suited for automotive and air transport applications where weight reduction is a key advantage.

EXAMPLES

The following examples are presented to further illustrate the composition of this invention, but are not to be construed as limiting the invention, which is delineated in the appended claims. All parts and percentages in the examples are on a weight basis and all measurements were obtained at room temperature (approximately 25° C.) unless indicated to the contrary.

The following materials, listed alphabetically for ease of reference, were employed in the examples.

BUTANOL=n-butanol (98% purity).
CATALYST=a 4% platinum complex of 1,3-diethenyl- 1,1,3,3-tetramethyldisiloxane in toluene (96%).
CYCLICS=a mixture of methylvinylpolycyclosiloxanes, about 90% being (MeViSiO)$_4$ in which Me and Vi hereinafter denote methyl and vinyl groups, respectively.
KP-32=Daphne Oil KP32-U, a paraffin oil having a viscosity of 35 cS (m$^2$/s) at 40° C. and marketed by Apollo America Corp., Southfield, Mich.
PENTANE=n-pentane 98.5% purity.
PIB1=EPION® 200A, an allyl-terminated telechelic polyisobutylene polymer having a number average molecular weight of about 5,500, a functionality of about 1.9 and a viscosity of 530,000 mPa-s (marketed by Kanegafuchi Kagaku Kogyo Kabushiki Kaisha, Japan).
SILICA=a treated fumed silica filler having a specific surface area of 140 m$^2$/g; obtained from Wacker Silicones Coporation (Adrian, Mich.) under the tradename HDK H2000™ Fumed Silica.
WATER=deionized water.
X-LINKER1=An organohydrogenpolysiloxane crosslinker having the structure Me$_3$SiO(MeHSiO)$_n$SiMe$_3$ wherein the average value of n is 20.
X-LINKER2=An organohydrogenpolysiloxane crosslinker having the structure Me$_3$SiO(MeHSiO)$_n$SiMe$_3$ wherein the average value of n is 30.
X-LINKER3=An organohydrogenpolysiloxane crosslinker having the structure Me$_3$SiO(MeHSiO)$_n$SiMe$_3$ wherein the average value of n is 10.
X-LINKER4=An organohydrogenpolysiloxane crosslinker having the structure Me$_3$SiO(MeHSiO)$_n$SiMe$_3$ wherein the average value of n is 60.
X-LINKER5=An organohydrogenpolysiloxane crosslinker having the structure Me$_3$SiO(Me$_2$SiO)$_m$(MeHSiO)$_n$SiMe$_3$ wherein the average value of m is 3 and the average value of n is 5.

Examples 1–11

A masterbatch consisting of 65% PIB1, 22% KP-32 and 13% SILICA was prepared by thoroughly blending these components in a 4 ounce (118 cm$^3$) polypropylene drink cup, using a spatula to mix the ingredients. Twenty parts of this masterbatch were placed in a tared disposable cup and a crosslinker, PENTANE, CYCLICS and water were added in sequence in the amounts indicated in Table 1 and mixed to homogeneity. CATALYST was added at a level of 35 ppm Pt metal based on the total weight of the polymer and rapidly mixed in to form a composition which foamed within a few seconds. Foaming was completed within 3 minutes in each case. The resulting materials were white, elastic, fine-pored polyisobutylene rubber foams.

Bulk density of the above described foams was determined according to a modified version of American Society for Testing Materials (ASTM) method D 3574-95, test A. Briefly, after each composition was foamed and cured in a polypropylene cup, as described supra, excess foam (i.e., above the rim of the cup) was cut off with an electric knife. The weight of the foam plus cup was measure and, since the volume of the cup (foam) was known, the bulk density of the foam was calculated and reported in Table 1.

TABLE 1

| Example | Crosslinker type | Crosslinker amount | PENTANE | BUTANOL | Water | CYCLICS | Density (kg/m$^3$) |
|---|---|---|---|---|---|---|---|
| 1 | X-LINKER1 | 3 | 3 | 0.1 | 2 | 0.4 | 135 |
| 2 | X-LINKER1 | 3 | 1.5 | 0.5 | 2 | — | 122 |
| 3 | X-LINKER1 | 3 | 3 | 0.1 | 2 | 0.4 | 143 |
| 4 | X-LINKER1 | 3 | 3 | — | 2 | 0.6 | 192 |
| 5 | X-LINKER1 | 3 | — | 0.1 | 2 | 0.4 | 178 |
| (Comp.) 6 | X-LINKER1 | 3 | — | — | 2 | 0.4 | 344 |
| 7 | X-LINKER2 | 2.8 | 3 | 0.1 | 2 | 0.4 | 149 |
| 8 | X-LINKER3 | 3 | 3 | 0.1 | 2 | 0.4 | 192 |
| (Comp.) 9 | X-LINKER4 | 2.7 | 3 | 0.1 | 2 | 0.4 | 320 |
| (Comp.) 10 | X-LINKER5 | 3 | 3 | 0.1 | 2 | 0.4 | 272 |
| (Comp.) 11 | X-LINKER5 | 3 | 3 | — | 2 | 0.4 | 352 |

It can be seen from Table 1 that only the compositions of the invention resulted in foams having a density no greater than 12 lb/ft$^3$ (192 kg/m$^3$) whereas (Comparative) Examples 6 and 9–11 resulted in foams having significantly greater densities.

That which is claimed is:

1. A composition comprising:
(A) 100 parts by weight of a saturated hydrocarbon polymer containing at least 1.5 alkenyl groups per molecule;
(B) 5 to 20 parts by weight of a silicone crosslinker comprising an average of 7 to 50 organohydrogensiloxane units;
(C) 1 to 20 parts by weight of water;
(D) at least one component selected from the group consisting of
(D') 0.1 to 20 parts by weight of an alcohol having 1 to 12 carbon atoms and
(D") 5 to 30 parts by weight of a hydrocarbon liquid having a normal boiling point below 100° C.; and
(E) a sufficient amount of a hydrosilation catalyst to promote crosslinking of said polymer by said crosslinker.

2. A foamed product having a density of 192 kg/m³ or less, said product being prepared by reacting
(A) 100 parts by weight of a saturated hydrocarbon polymer containing at least 1.5 alkenyl groups per molecule;
(B) 5 to 20 parts by weight of a silicone crosslinker comprising an average of 7 to 50 organohydrogensiloxane units;
(C) 1 to 20 parts by weight of water;
(D) at least one component selected from the group consisting of
(D') 0.1 to 20 parts by weight of an alcohol having 1 to 12 carbon atoms and
(D") 5 to 30 parts by weight of a hydrocarbon liquid having a normal boiling point below 100° C.; and
(E) a sufficient amount of a hydrosilation catalyst to promote crosslinking of said polymer by said crosslinker.

3. The composition according to claim 1, wherein said saturated hydrocarbon polymer is selected from the group consisting of a polyisobutylene homopolymer or polyisobutylene copolymer.

4. The composition according to claim 3, wherein said crosslinker is a polysiloxane having the formula

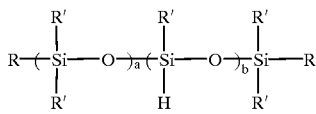

wherein R is independently selected from the group consisting of hydrogen, alkyl radicals having 1 to 10 carbon atoms and aryl radicals having 6–14 carbon atoms, R' is independently selected from the group consisting of alkyl radicals having 1 to 6 carbon atoms and aryl radicals having 6 to 14 carbon atoms, a has a value of 0 to 10 and b has a value of 7 to 50.

5. The composition according to claim 4, wherein R and R' of said crosslinker are methyl, a is 0 to 5 and b is 10 to 30.

6. The composition according to claim 1, further comprising at least one hydrosilation inhibitor.

7. The composition according to claim 5, further comprising at least one hydrosilation inhibitor.

8. The composition according to claim 7, wherein 10 to 20 parts by weight of said crosslinker, 5 to 10 parts by weight of said water, 0.5 to 10 parts by weight of said alcohol and 10 to 20 parts by weight of said hydrocarbon liquid are used for each 100 parts by weight of said polymer.

9. The composition according to claim 5, wherein said crosslinker has the formula

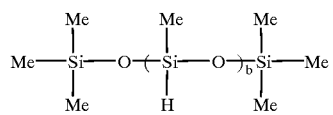

in which Me denotes a methyl group and b has an average value of 10 to 20.

10. The composition according to claim 6, wherein said crosslinker has the formula

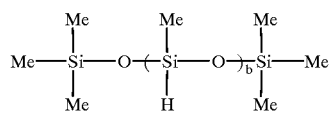

in which Me denotes a methyl group and b has an average value of 10 to 20.

11. The composition according to claim 7, wherein said crosslinker has the formula

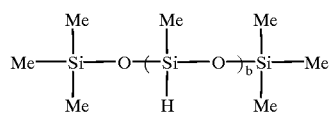

in which Me denotes a methyl group and b has an average value of 10 to 20.

12. The composition according to claim 8, wherein said crosslinker has the formula

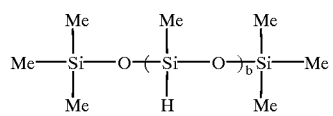

in which Me denotes a methyl group and b has an average value of 10 to 20.

* * * * *